United States Patent
Hollis (10) Patent No.: US 7,869,494 B2
(45) Date of Patent: Jan. 11, 2011

(54) EQUALIZER CIRCUITRY FOR MITIGATING PRE-CURSOR AND POST-CURSOR INTERSYMBOL INTERFERENCE

(75) Inventor: Timothy M. Hollis, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 639 days.

(21) Appl. No.: 11/866,813

(22) Filed: Oct. 3, 2007

(65) Prior Publication Data

US 2009/0092180 A1    Apr. 9, 2009

(51) Int. Cl.
*H03H 7/40* (2006.01)
(52) U.S. Cl. ............... 375/229; 375/233; 375/348; 455/43; 455/501; 455/307
(58) Field of Classification Search .......... 375/229, 375/230, 232, 233, 285, 346, 348, 349, 350; 455/43, 501, 296, 303, 306, 307; 708/322, 708/323

See application file for complete search history.

(56) References Cited

U.S. PATENT DOCUMENTS

| 7,356,105 | B1* | 4/2008 | Nergis | 375/346 |
| 7,428,265 | B1* | 9/2008 | Adireddy et al. | 375/233 |
| 2008/0240223 | A1* | 10/2008 | Badalone | 375/233 |

OTHER PUBLICATIONS

James E.C. Brown and Paul J. Hurst, "Adaptive Continuous-Time Forward Equalization for DFE-Based Disk-Drive Read Channels," 29th Asilomar Conference on Signals, Systems and Computers, pp. 668-672 (1996).

Richard Schneider, "An Improved Pulse-Slimming Method for Magnetic Recording," IEEE Transaction of Magnetics, vol. 11, No. 5, pp. 1240-1241 (1975).

J.E.C. Brown et al., "A CMOS adaptive continuous-time forward equalizer, LPF, and RAM-DFE for magnetic recording," IEEE J. Solid-State Circuits, vol. 34, no. 2, pp. 162-169 (Feb. 1999).

James E.C. Brown, "Continuous-Time Forward Equalization for the Decision-Feedback-Equalizer-Based Read Channel," IEEE Transactions on Magnetics, vol. 34, No. 4, pp. 2372-2381 (Jul. 1998).

* cited by examiner

*Primary Examiner*—Dac V Ha
(74) *Attorney, Agent, or Firm*—Wong, Cabello, Lutsch, Rutherford & Brucculeri, LLP (57) ABSTRACT

One or more embodiments of the invention comprise a continuous-time equalizer (CTE) for reducing both pre-cursor and post-cursor intersymbol interference (ISI) from data received from a communication channel. One such equalizer comprises two independent stages that process the input signal in parallel. One stage subtracts a scaled version of the derivative of the input signal from a scaled version of the input signal to reduce pre-cursor ISI from the input signal. The other stage adds a scaled version of the derivative of the input signal to a scaled version of the input signal to reduce post-cursor ISI from the input signal. The outputs from the two stages are then multiplied to arrive at an output signal in which both pre- and post-cursor ISI is minimized. Because the scalars used in each of the stages are independent, each can be adjusted for greater manipulation of the ISI-reduced signal.

25 Claims, 6 Drawing Sheets

EQUALIZER CIRCUITRY FOR MITIGATING PRE-CURSOR AND POST-CURSOR INTERSYMBOL INTERFERENCE

FIELD OF THE INVENTION

Embodiments of this invention relate to techniques and circuitry for reducing intersymbol interference (ISI) from data received from a channel.

BACKGROUND

Circuit designers of multi-Gigabit systems face a number of challenges as advances in technology mandate increased performance in high-speed components. For example, chip-to-chip data rates have traditionally been constrained by the bandwidth of input/output (I/O) circuitry in each component. However, process enhancements (e.g., transistor bandwidth) and innovations in I/O circuitry have forced designers to also consider the effects of the transmission channels between the chips on which data is sent.

Figure 1:
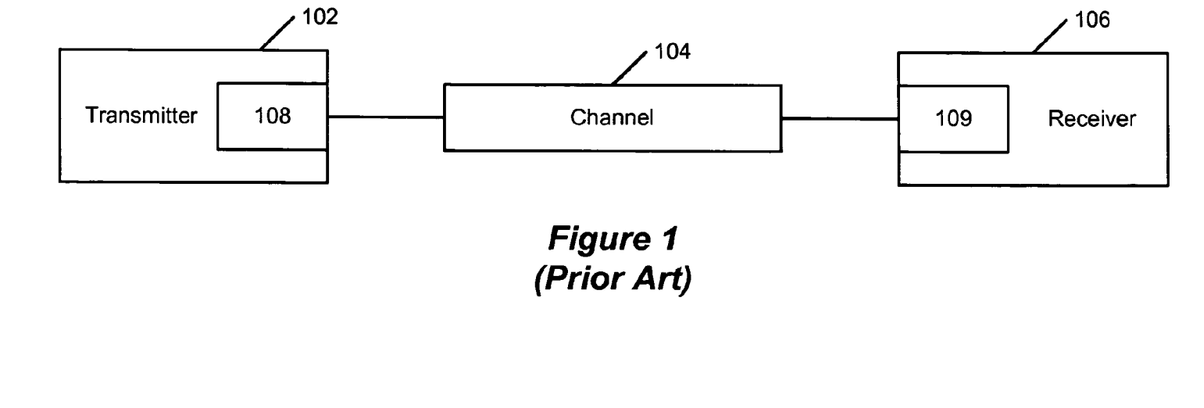
FIG. 1 illustrates a block diagram of a transmission system including a transmitter, a receiver, and a channel connecting the two.

At a basic level, data transmission between components within a single semiconductor device, or between two devices on a printed circuit board, may be represented by the system 100 shown in FIG. 1. In FIG. 1, a transmitter 102 (e.g., a microprocessor) sends data over channel 104 (e.g., a copper trace on a printed circuit board or "on-chip" in a semiconductor device) to a receiver 106 (e.g., another processor or memory). When data is sent from an ideal transmitter 102 to a receiver 106 across an ideal (lossless) channel, all of the energy in a transmitted pulse will be contained within a single time cell or unit interval (UI).

Figure 2:
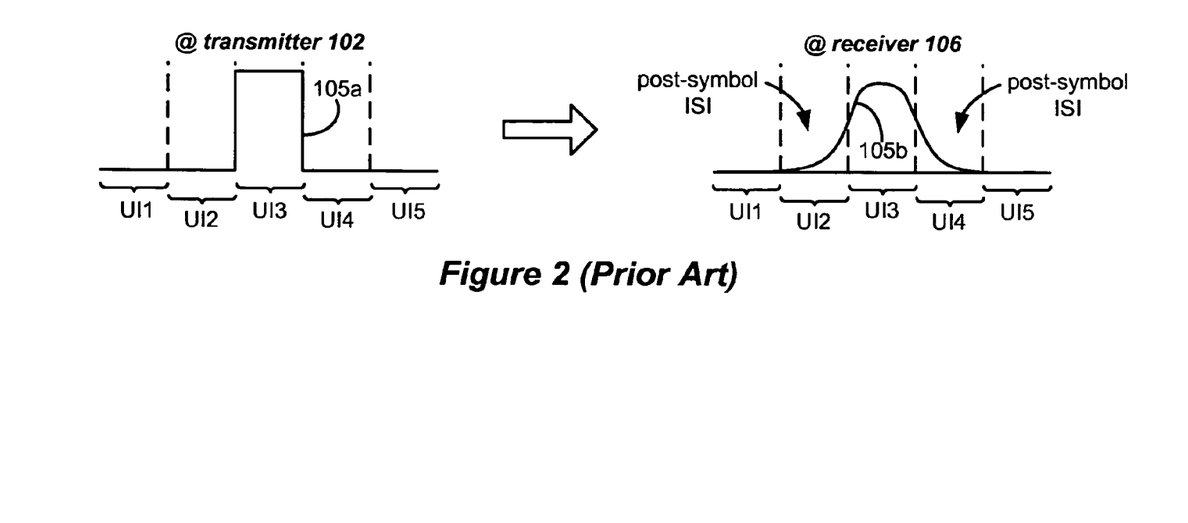
FIG. 2 illustrates the effect of a transmission channel on pulses sent across the channel, and in particular shows pre-cursor and post-cursor intersymbol interference (ISI).

However, real transmitters and real transmission channels do not exhibit ideal characteristics. Due to a number of factors, including, for example, the limited conductivity of copper traces, the dielectric medium of the printed circuit board (PCB), and discontinuities introduced by vias, an initially well-defined digital pulse will tend to spread or disperse as it passes through the transmission channel. This is shown in FIG. 2. As shown, a single pulse of data 105a is sent by the transmitter 102 during a given unit interval UI (e.g., UI3). However, because of the effect of the channel 104, this data pulse becomes spread 105b over multiple UIs at the receiver 106, i.e., some portion of the energy of the pulse is observed outside of the UI in which the pulse was sent (e.g., in UI2 and UI4). This residual energy outside of the UI of interest may perturb a pulse otherwise occupying either of the neighboring UIs, in a phenomenon referred to as intersymbol interference (ISI). As shown, residual energy appearing before the UI of interest (i.e., in UI2) comprises pre-symbol ISI, while residual energy appearing after the UI of interest (i.e., in UI4) comprises post-symbol ISI.

Because ISI can give rise to sensing errors at the receiver 106, a number of solutions have been proposed to compensate for the effects of ISI (e.g., by offsetting the effects of ISI). On the transmitter 102 side, an equalizer 108 (an equalizer is sometimes also referred to a filter; these terms are interchangeable) may be employed to compensate for the anticipated effects of the channel 104. Such an equalizer 108 attempts to pre-condition the transmitted signal such that the effect of the channel 104 is removed. One such technique comprises the use of finite-impulse response (FIR) filters. See, e.g., R. W. Lucky et al., "Automatic equalization for digital communication," in Proc. IEEE, vol. 53, no. 1, pp. 96-97 (January 1965); R. W. Lucky and H. R. Rudin, "Generalized automatic equalization for communication channels," in Proc. IEEE, vol. 53, no. 3, pp. 439-440 (March 1966); S. Reynolds et al., "A 7-tap transverse analog-FIR filter in 0.13 µm CMOS for equalization of 10-Gb/s fiber-optic data systems," in Proc. IEEE Int. Solid-State Circuits Conf., pp. 330-331 (February 2005); M. E. Said et al., "A 0.5-µmSiGe pre-equalizer for 10-Gb/s single-mode fiber optic links," in Proc. IEEE Int. Solid-State Circuits Conf., pp. 224-225 (February 2005); and J. E. Jaussi et al., "8-Gb/s source-synchronous I/O link with adaptive receiver equalization, offset cancellation, and clock de-skew," IEEE J. Solid-State Circuits, vol. 40, no. 1, pp. 80-88 (January 2005). Such an FIR filter 108 performs processes known as pre-emphasis or de-emphasis in which the signal is intentionally pre-distorted before it is transmitted to compensate for the anticipated effects of the channel 104. An FIR filter 108 may alternatively be employed on the receiver side 106 to compensate for effects of the channel. Unfortunately, FIR filters typically require multiple taps to compensate for the losses in a channel, resulting in larger, more power-hungry, and more complicated circuitry.

Alternatively, on the receiver 106 side, an equalizer 109 may be used to compensate for the effects of the channel 104, including ISI. The transfer function of an ideal equalizer is the inverse of the transfer function of the channel 104, and a practical equalizer attempts to recreate this inverse frequency response. One such ISI-mitigating technique includes the use of a decision feedback equalizer (DFE) 109 at the receiver 106 side of the transmission. See, e.g., M. E. Austin, "Decision-feedback equalization for digital communication over dispersive channels," Massachusetts Institute of Technology: Research Laboratory of Electronics, Cambridge, Tech. Rep. 461 (1967); M. Sorna et al., "A 6.4-Gb/s CMOS SerDes core with feedforward and decision-feedback equalization," in Proc. IEEE Int. Solid-State Circuits Conf., pp. 62-63 (February 2005); R. Payne et al., "A 6.25-Gb/s binary adaptive DFE with first post-cursor tap cancellation for serial backplane communications," in Proc. IEEE Int. Solid-State Circuits Conf., pp. 68-69 (February 2005); J. W. M. Bergmans, "Digital magnetic recording systems," IEEE Trans. Magn., vol. 24, pt. 1, pp. 683-688 (January 1988); and R. S. Kajley et al., "A mixed-signal decision-feedback equalizer that uses a look-ahead architecture," IEEE J. Solid-State Circuits, vol. 32, no. 3, pp. 450-459 (March 1997). A DFE presents an attractive solution as it is fairly resistant to high-frequency noise amplification, and further provides a variable detection threshold that may be designed to follow shifts or trends in data resulting from ISI. However, DFEs are more difficult to implement than FIR filters in the multi-Gigahertz frequency range due to the necessary reliance on feedback from past decisions, and the need to employ multiple taps.

A third equalization option comprises the use of a continuous-time equalizer (CTE). See, e.g., B. K. Casper et al, "A 20 Gb/s Forwarded Clock Transceiver in 90 nm CMOS," Proceedings of the IEEE International Solid State Circuit Conference, San Francisco, Calif., pp. 263-272 (February 2006); Y. Tomita et al., "A 10-Gb/s receiver with series equalizer and on-chip ISI monitor in 0.11-µm CMOS," IEEE J. Solid-State Circuits, vol. 40, no. 4, pp. 986-993 (April 2005); J. E. C. Brown et al., "A CMOS adaptive continuous-time forward equalizer, LPF, and RAM-DFE for magnetic recording," IEEE J. Solid-State Circuits, vol. 34, no. 2, pp. 162-169 (February 1999); James E. C. Brown, "Continuous-Time Forward Equalization for the Decision-Feedback-Equalizer-Based Read Channel," IEEE Transactions on Magnetics, Vol. 34, No. 4, pp. 2372-81 (July 1998); and H. Higashi et al., "A 5-6.4-Gb/s 12-channel transceiver with pre-emphasis and equalization," IEEE J. Solid-State Circuits, vol. 40, no. 4, pp. 978-985 (April 2005).

Figure 3A:
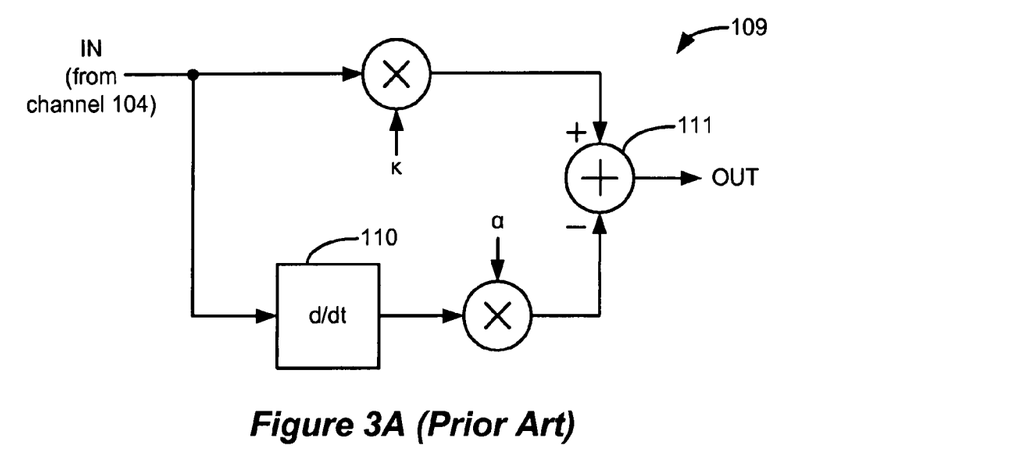
FIGS. 3A and 3B illustrate a prior art equalizer for pre-cursor ISI reduction involving the subtraction of a scaled derivative of an input signal from a scaled version of the input signal.
Figure 3B:
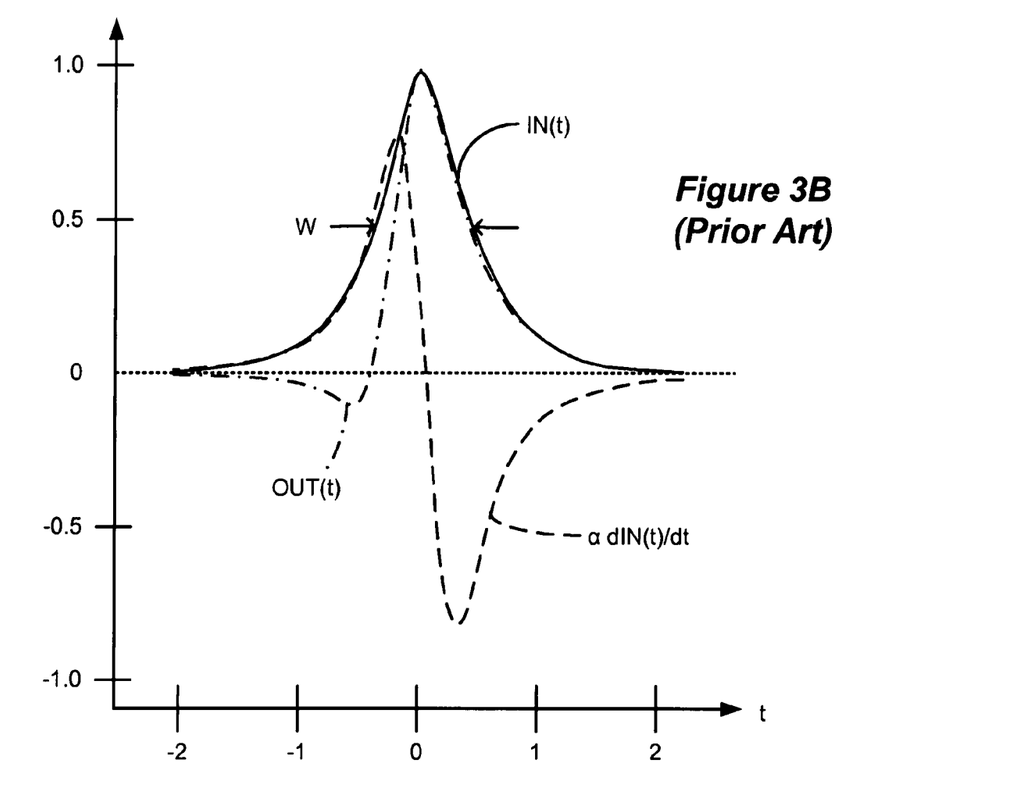

One type of continuous-time equalizer (CTE) 109 implementable at the receiver 106 is illustrated in FIGS. 3A and 3B, which depicts circuitry disclosed in James E. C. Brown and Paul J. Hurst, "Adaptive Continuous-Time Forward Equalization for DFE-Based Disk-Drive Read Channels," 29$^{th}$ Asilomar Conference on Signals, Systems and Computers, pp. 668-672 (1996), which is incorporated herein by reference in its entirety. In FIG. 3A, the input signal, IN, is input to the CTE 109 from the channel 104. As shown in FIG. 3B, this input signal has been dispersed by ISI. Such dispersion in the input signal IN can be modeled as a Lorentzian pulse, which is governed by the following formula:

$$IN(t)=1/[1+(2t/W)^2]$$

where W equals the pulse width at half the maximum amplitude.

In the depicted CTE 109, the input signal is split, with one leg being sent to a differentiator block 110. Thereafter, the original signal and the differentiated version of the original signal are scaled (e.g., weighted) by κ and α respectively, and then the differentiated version is subtracted at a subtractor 111. (As shown in this disclosure, subtraction functionality is portrayed as being performed by an adder with a negative input, such as is seen in the lower leg in FIG. 3A. This representation for subtraction is used to make clear which input is subtracted from which). When the scalars κ and α are chosen appropriately, the effect is to reduce pre-cursor ISI in the resulting output signal. This is shown by a reduction in the prominence of the rising edge in the produced output signal, OUT, as shown in FIG. 3B.

This approach of Brown & Hurst should reduce pre-cursor ISI as stated. However, the CTE 109 of FIG. 3A does not address, and does not attempt to address, post-cursor ISI. In fact, the Brown & Hurst article addresses minimization of post-cursor ISI using an entirely different circuit, namely a multi-tap DFE circuit, similar to those discussed above. In this respect, the present inventor has determined that the approach of Brown & Hurst is inefficient, as it requires two different circuits (a CTE and a DFE) to address both pre-cursor and post-cursor ISI, which essentially doubles the effort needed to engineer, lay out, and optimize a comprehensive ISI mitigation solution.

Figure 4:
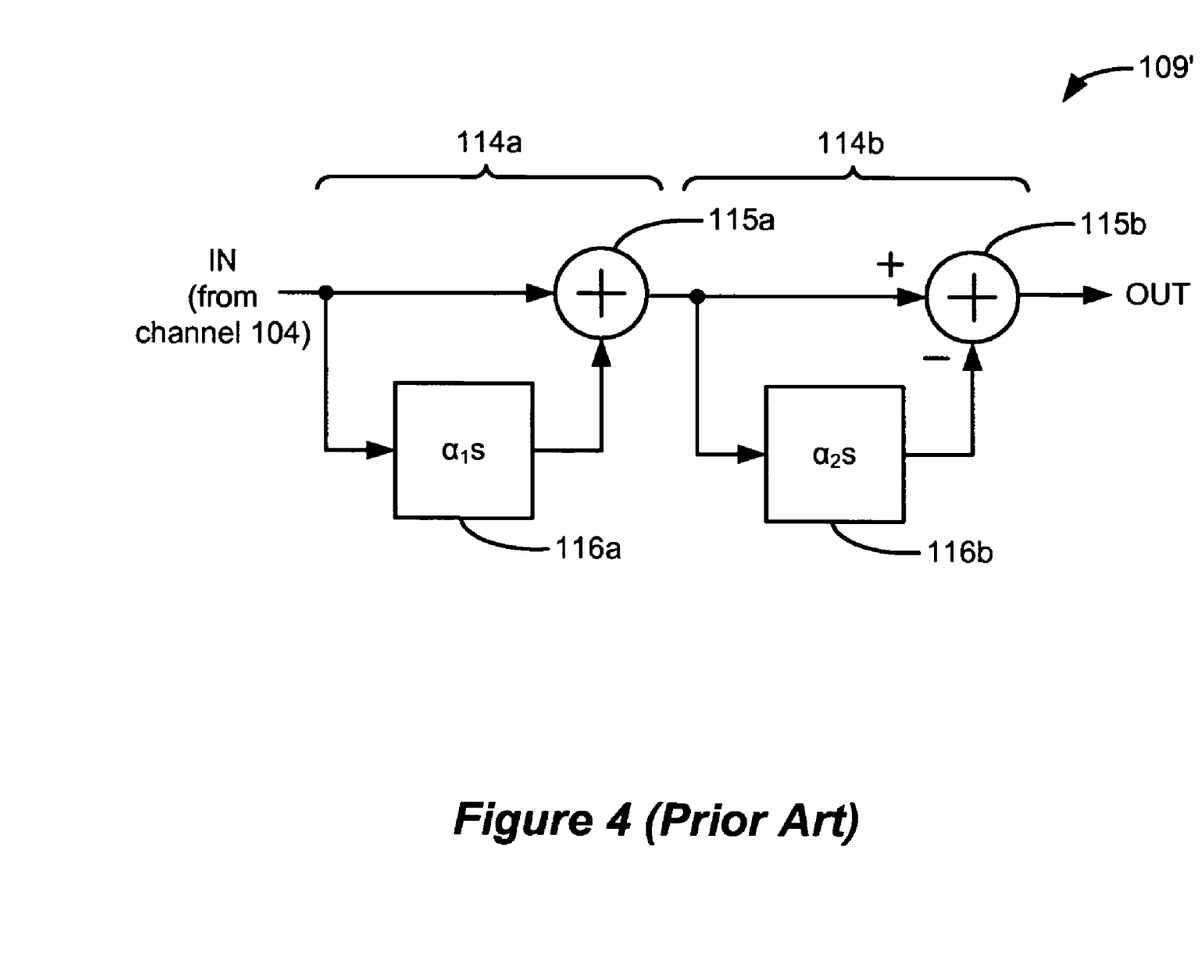
FIG. 4 illustrates a prior art equalizer for pre- and post-cursor ISI reduction involving the subtraction and addition in series-connected stages of a scaled derivate of an input signal from a non-scaled version of the input signal.

Another CTE implementation was posited in Richard Schneider, "An Improved Pulse-Slimming Method for Magnetic Recording," IEEE Transaction of Magnetics, Vol. 11, No. 5, pp 1240-41 (1975), which is incorporated herein in its entirety. While not specifically noted as a circuit useful to counter ISI, Schneider's equalizer circuit has the capability of "slimming" both the rising and falling edges of a pulse in real time, and so is usable to mitigate both pre-cursor and post-cursor ISI. As shown in FIG. 4, Schneider illustrates his equalizer circuit 109' in the Laplace domain, which is related to the frequency domain through the relationship 's'='jw', where 'w' is the radian frequency. Schneider's equalizer 109' comprises two stages 114a and 114b, which respectively slim the falling edge and the rising edge of the input signal, IN. As one skilled in the art will appreciate, a single 's' term, as appears in blocks 116a and 116b, comprises a first order derivative (d/dt). Accordingly, each of blocks 116a or 116b are equivalent to the scaled differentiator 110 of FIG. 3A, where once again the derivatives are scaled by alpha terms α1 and α2 respectively. Stage 114a mitigates post-cursor ISI through its use of an adder 115a, while stage 114b mitigates pre-cursor ISI (similar to Brown & Hurst's approach; FIG. 3A) through its use of a subtractor 115b.

Schneider's equalizer 109' is in one sense a preferable circuit to use in the mitigation of ISI because, as previously noted, Schneider's circuit can reduce both pre-cursor ISI and post-cursor ISI. That being said, the present inventor has determined that the equalizer circuit 109' has shortcomings. Specifically, and unlike the approach of Brown & Hurst's equalizer 109 (FIG. 3A), Schneider's equalizer 109' does not allow for the scaling of the input signal. Instead, Schneider's circuit 109' only allows for the scaling of the derivatives, i.e., by $α_1$ and $α_2$. In other words, the circuit 109' does not allow for the scaling of the undifferentiated part of the input signal, as was the function of scalar κ in Brown & Hurst's circuit 109. The present inventor considered this unfortunate, because, the inability to scale of the input signal reduces design flexibility, which ultimately hampers flexibility to reduce ISI. This is significant because, depending on the factors causing dispersion in the channel 104, it may be advantageous for the design to be able to equalize pre-cursor ISI with more or less severity than post-cursor ISI. Moreover, in today's high-frequency systems, Schneider's approach, which uses serially-connected stages 114a and 114b, adds undesirable delay and phase shift to the input signal, IN.

A better, more flexible, and easier to implement equalization solution, capable of mitigating both pre-cursor and post-cursor ISI, is therefore desired.

DETAILED DESCRIPTION

One or more embodiments of the invention comprise a continuous-time equalizer (CTE) for reducing both pre-cursor and post-cursor intersymbol interference (ISI) from data received from a communication channel. One such equalizer comprises two independent stages that process the input signal in parallel. One stage subtracts a scaled version of the derivative of the input signal from a scaled version of the input signal to reduce pre-cursor ISI from the input signal. The other stage adds a scaled version of the derivative of the input signal to a scaled version of the input signal to reduce post-cursor ISI from the input signal. The outputs from the two stages are then multiplied to arrive at an output signal in which both pre- and post-cursor ISI are minimized. Because the scalars used in each of the stages are independent, each can be adjusted for greater manipulation of the ISI-reduced signal.

Figure 5A:
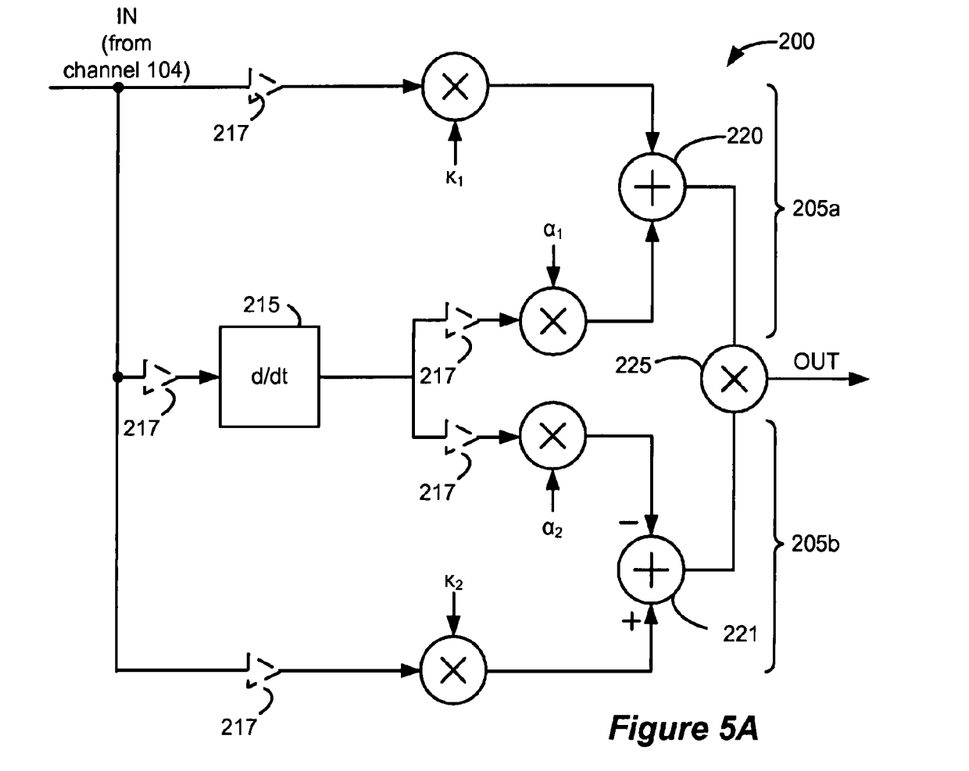
FIGS. 5A-5C illustrate an improved equalizer for pre- and post-cursor ISI reduction involving subtraction and addition in parallel stages of a scaled derivative of an input signal from a scaled version of the input signal.

One example of the improved CTE 200 is shown in FIG. 5A. As shown, equalizer 200 contains two independently tunable stages, 205a and 205b, which process the input signal, IN, in parallel. Stage 205a mitigates post-cursor ISI from the input signal, while stage 205b mitigates pre-cursor ISI from the input signal. As will be explained further below, each stage 205a and 205b can be tuned independently from the other stage.

Each stage 205a or 205b receives in parallel both the input signal, IN, and the derivative of the input signal, dIN/dt, as provided by differentiator block 215. Because these signals are shared in the stages 205a and 205b, buffer them can help keep the effects in one stage from inadvertently affecting the signals in the other stage. Such buffers 217 are shown in dotted lines. Alternatively, two differentiator blocks 215a and 215b could be used, as shown in FIG. 5C, in which the differentiation is carried out through active filtering with the scalars $\alpha_1$ and $\alpha_2$ accounted for by adjustment of the gains of the differentiators themselves.

The input signal and its derivative are scaled in each stage 205a and 205b by scalars κ and α respectively. Specifically, in stage 205a, the input signal is scaled by $\kappa_1$ while the derivative is scaled by $\alpha_1$; in stage 205b, the input signal is scaled by $\kappa_2$ while the derivative is scaled by $\alpha_2$.

Stage 205b subtracts the scaled derivative ($\alpha_2$dIN/dt) of the input signal (IN(t)) from the scaled version of the input signal ($\kappa_2$IN(t)) at a subtractor 221, which produces an output in which pre-cursor ISI present in the input signal, IN, is reduced. The other stage 205a, by contrast, adds the scaled versions of the input signal ($\kappa_1$IN(t)) and the derivative ($\alpha_1$dIN/dt) at an adder 220. Because of the change in polarity of the derivative (see FIG. 3B), this stage 205a produces an output in which post-cursor ISI present in the input signal, IN, is reduced.

Figure 5B:
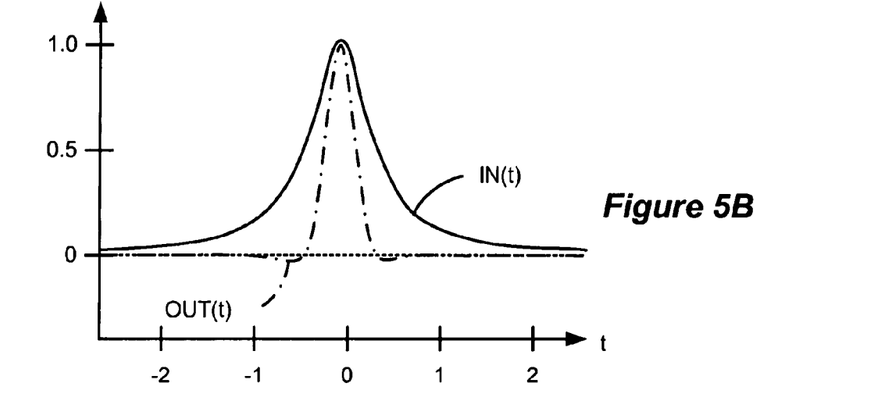
Figure 5C:
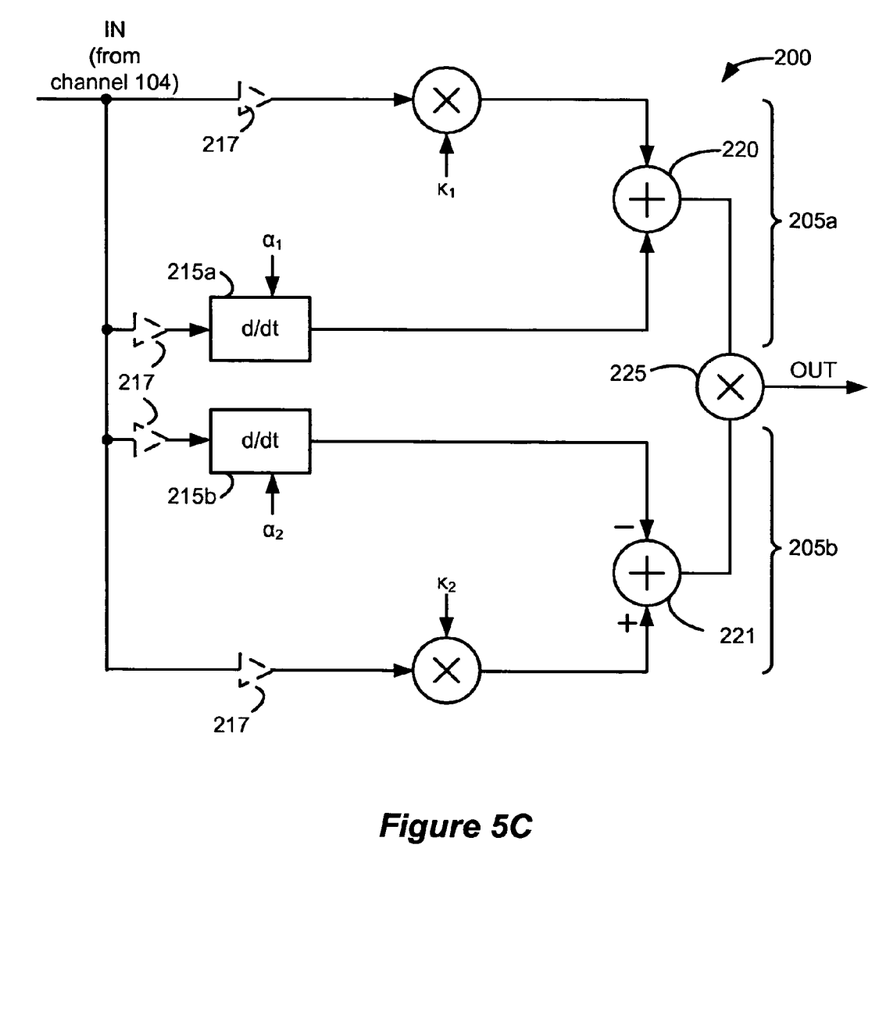

The outputs of the two stages 205a and 205b are then multiplied at a multiplier 225 to produce the output, OUT, which comprises a signal in which both pre- and post-cursor ISI have been minimized in stages 205b and 205a respectively, as shown in FIG. 5B. Alternatively, block 225 can comprise any processing block for combining the first and second output signals to produce an equalized signal, which block may perform functions other than multiplication as one skilled in the art will understand.

As shown, the resulting signal OUT is symmetric, indicating that $\kappa_1=\kappa_2$ and $\alpha_1=\alpha_2$. However, this is not strictly necessary, and would not be advisable in a given application where it was desired to mitigate either pre- or post-cursor ISI with more severity than the other. As noted earlier, the improved equalizer 200 allows for independent tuning in each of the stages 205a and 205b, and hence independent shaping of the rising and falling edges in the input pulse. Moreover, because the stages 205a and 205b process the input signal in parallel, the improved equalizer should impart less relative delay and phase shift to the input signal as seen by the two stages of the equalizer, making the equalizer 200 suitable for use in higher-frequency systems.

Figure 6:
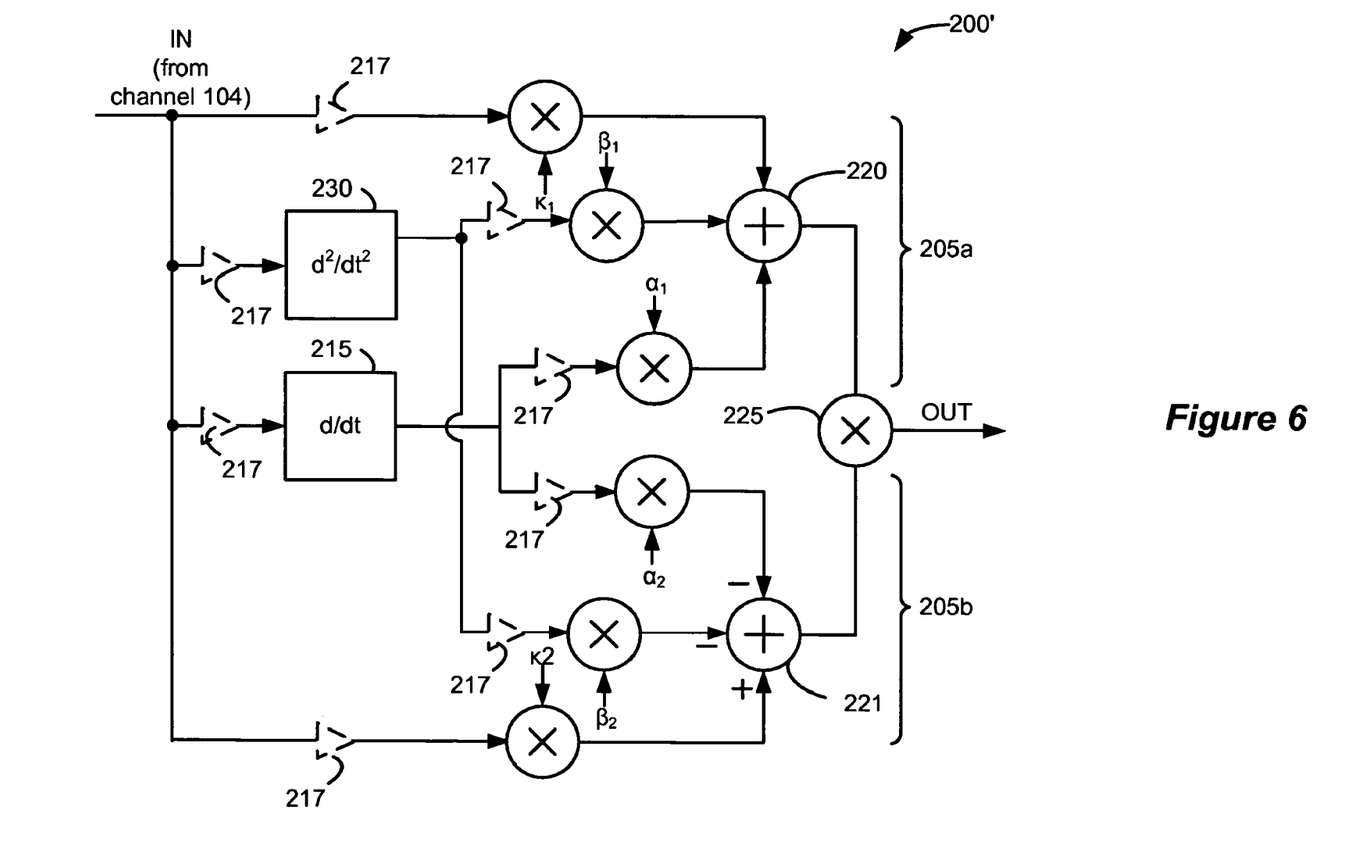
FIG. 6 illustrates an alternative embodiment of the equalizer of FIG. 5 which additionally employs a second-order differentiator.

Other modifications can be made to the improved equalizer 200. For example, each stage 205a and 205b can be modified to include an additional scalable second-order derivative term, as shown in FIG. 6. The use and benefits of incorporation of a scalable second-order derivative for equalization is discussed in James E. C. Brown, "Continuous-Time Forward Equalization for the Decision-Feedback-Equalizer-Based Read Channel," IEEE Transactions on Magnetics, Vol. 34, No. 4, pp. 2372-81 (July 1998). Because scalable second-order derivatives and their potential benefits in this context are discussed in this reference, they are not further elaborated upon here.

As noted, the improved disclosed equalizer 200 employs at least a first order differentiator block 215, adder/subtractor blocks 220 and 221, and a multiplier block 225 (see FIG. 5A). It is not particularly important to the implementation of the equalizer 200 what circuitry are used for these blocks, and one skilled in the art will recognize that many designs for these blocks are possible. One possible differentiator block design useable in the disclosed equalizer 200 is disclosed in FIG. 7 of H. Higashi et al., "A 5-6.4-Gb/s 12-channel transceiver with pre-emphasis and equalization," IEEE J. Solid-State Circuits, vol. 40, no. 4, pp. 978-985 (April 2005), which in incorporated herein by reference. One possible adder (or subtractor) block design is disclosed in D. Corner et al., "A High-Frequency CMOS Current Summing Circuit," Analog Integrated Circuits and Signal Processing, Vol. 36, pp. 215-220 (2003), which is incorporated herein by reference. Exemplary multiplier blocks useable in the disclosed equalizer 200 can comprise those disclosed in the following references, which are all incorporated herein by reference: Chi-Hung Lin & M. Ismail, "A 1.8 V high dynamic-range CMOS high-speed four quadrant multiplier," Proceedings: Ninth Great Lakes Symposium on VLSI, 1999, pp. 372-375 (March 1999); J. Pena-Final & J. A. Connelly, "A MOS Four-Quadrant Analog Multiplier Using the Quarter-Square Technique," IEEE J. Solid State Circuits, Vol. sc-22, No. 6, pp. 1064-73 (December 1987); and H. J. Song & C. K. Kim, "An MOS Four-Quadrant Analog Multiplier Using Simple Two-Input Squaring Circuits with Source Followers," IEEE J. Solid State Circuits, Vol. 25, No. 3, pp. 841-48 (June 1990). Although disclosed as having discrete blocks for performing each of these mathematical functions, it is also possible to conflate the functionalities of each into a single circuit having the same transfer function as the circuit depicted in FIG. 6. In short, there are many different ways to implement the functionality and transfer function of the disclosed improved equalizer 200.

While preferred embodiments of the invention have been disclosed, it should be understood that the disclosed circuitry can be achieved in many different ways to the same useful ends as described herein. In short, it should be understood that the inventive concepts disclosed herein are capable of many modifications. To the extent such modifications fall within the scope of the appended claims and their equivalents, they are intended to be covered by this patent.

What is claimed is:

1. An equalizer circuit for producing an equalized signal from an input signal received from a channel, comprising:
    a first stage, wherein the first stage scales an input signal by a first scalar and a derivative of the input signal by a second scalar, wherein the first stage adds the scaled derivative of the input signal to the scaled input signal to produce a first output;
    a second stage, wherein the second stage scales the input signal by a third scalar and the derivative of the input signal by a fourth scalar, wherein the second stage subtracts the scaled derivative of the input signal from the scaled input signal to produce a second output; and
    a processing block for combining the first and second outputs to produce the equalized signal.

2. The equalizer circuit of claim 1, wherein the first and third scalars are different.

3. The equalizer circuit of claim 1, wherein the second and fourth scalars are different.

4. The equalizer circuit of claim 1, wherein the first and second stages produce the first and second outputs in parallel.

5. The equalizer circuit of claim 1, wherein the processing block for combining the first and second outputs to produce the equalized signal comprises a multiplier.

6. An equalizer circuit for receiving an input signal from a channel having pre-cursor intersymbol interference (ISI) and post-cursor ISI and for producing an equalized signal, comprising:
- a first stage, wherein the first stage processes the input signal to produce a first output in which the pre-cursor ISI from the input signal is reduced;
- a second stage, wherein the second stage processes the input signal to produce a second output in which the post-cursor ISI from the input signal is reduced; and
- a processing block for combining the first and second outputs to produce the equalized signal in which both pre-cursor and post-cursor ISI from the input signal are reduced,
- wherein the first and second stages process the input signal in parallel.

7. The equalizer circuit of claim 6, wherein both the first stage and the second stage process the input signal and a first-order derivative of the input signal.

8. The equalizer circuit of claim 7, wherein both the input signal and the first-order derivative of the input signal are independently scaled in the first and second stages.

9. The equalizer circuit of claim 7, wherein both the first stage and the second stage further process a second-order derivative of the input signal.

10. The equalizer circuit of claim 6, wherein the processing block comprises a multiplier for multiplying the first and second outputs to produce the equalized signal.

11. An equalizer circuit for receiving an input signal from a channel having pre-cursor intersymbol interference (ISI) and post-cursor ISI and for producing an equalized signal, comprising:
- a first stage, wherein the first stage scales the input signal and scales a derivative of the input signal to produce a first output;
- a second stage, wherein the second stage scales the input signal and scales a derivative of the input signal to produce a second output; and
- a processing block for combining the first and second outputs to produce the equalized signal, wherein both pre-cursor and post-cursor ISI from the input signal are reduced.

12. The equalizer circuit of claim 11, wherein both the first stage and the second stage scale a first-order derivative of the input signal.

13. The equalizer circuit of claim 12, wherein both the first stage and the second stage scale a second-order derivative of the input signal.

14. The equalizer circuit of claim 11, wherein the processing block comprises a multiplier for multiplying the first and second outputs to produce the equalized signal.

15. The equalizer circuit of claim 11, wherein the first and second stages produce the first and second outputs in parallel.

16. The equalizer circuit of claim 11, wherein the input signal and the derivative of the input are scaled by independently-controllable scalars in both the first and second stages.

17. A method using a circuit for producing an equalized signal from an input signal having intersymbol interference (ISI), the method comprising:
- generating at a first circuit stage a first and second scaled version of the input signal;
- generating at a second circuit stage a first and second scaled derivative of the input signal;
- adding at a third circuit stage the first scaled derivative of the input signal to the first scaled version of the input signal to obtain a post-cursor ISI-reduced signal;
- subtracting at a fourth circuit stage the second scaled derivative of the input signal from the second scaled version of the input signal to obtain a pre-cursor ISI-reduced signal; and
- combining at a fifth circuit stage the post-cursor ISI-reduced signal and the pre-cursor ISI-reduced signal to produce the equalized signal.

18. The method of claim 17, wherein the first and second scaled versions of the input signal are different.

19. The method of claim 17, wherein the first and second scaled derivatives of the input signal are different.

20. The method of claim 17, wherein the adding and subtracting steps occur in parallel.

21. The method of claim 17, wherein combining the post-cursor ISI-reduced signal and the pre-cursor ISI-reduced signal comprises multiplying the post-cursor ISI-reduced signal and the pre-cursor ISI-reduced signal.

22. A method using a circuit for reducing intersymbol interference (ISI) from an input signal, the method comprising:
- processing the input signal at a first circuit stage to produce a first output in which the pre-cursor ISI from the input signal is reduced;
- processing the input signal at a second circuit stage to produce a second output in which the post-cursor ISI from the input signal is reduced; and
- combining the first and second outputs at a third circuit stage to produce an equalized signal in which both pre-cursor and post-cursor ISI from the input signal are reduced,
- wherein processing at the first and second stages occurs in parallel.

23. The method of claim 22, wherein both the first circuit stage and the second circuit stage process the input signal and a derivative of the input signal.

24. The method of claim 23, wherein both the input signal and the derivative of the input signal are independently scaled in the first and second circuit stages.

25. The method of claim 22, wherein combining the first and second outputs comprises multiplying the first and second outputs.

* * * * *